United States Patent
Kim et al.

(10) Patent No.: US 9,107,143 B2
(45) Date of Patent: Aug. 11, 2015

(54) APPARATUS AND METHOD FOR CONNECTING ACCESS POINT IN PORTABLE TERMINAL

(75) Inventors: Jong-Seok Kim, Suwon-si (KR); Hyung-Jun Jeon, Seoul (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 391 days.

(21) Appl. No.: 13/301,522

(22) Filed: Nov. 21, 2011

(65) Prior Publication Data

US 2012/0127925 A1 May 24, 2012

(30) Foreign Application Priority Data

Nov. 22, 2010 (KR) ........................ 10-2010-0116329

(51) Int. Cl.
*H04W 12/08* (2009.01)
*H04W 48/16* (2009.01)
*H04L 29/06* (2006.01)
*H04W 48/20* (2009.01)

(52) U.S. Cl.
CPC ............. *H04W 48/16* (2013.01); *H04L 63/104* (2013.01); *H04W 12/08* (2013.01); *H04W 48/20* (2013.01)

(58) Field of Classification Search
CPC combination set(s) only.
See application file for complete search history.

(56) References Cited

U.S. PATENT DOCUMENTS

| | | | |
|---|---|---|---|
| 7,716,475 B2 | 5/2010 | Asai et al. | |
| 2005/0257052 A1* | 11/2005 | Asai et al. | ...................... 713/166 |
| 2009/0270092 A1 | 10/2009 | Buckley et al. | |
| 2010/0110921 A1* | 5/2010 | Famolari et al. | .............. 370/252 |
| 2010/0184438 A1* | 7/2010 | Wu | ................ 455/436 |
| 2011/0171907 A1* | 7/2011 | Jolivet | ........................ 455/41.1 |

FOREIGN PATENT DOCUMENTS

| | | |
|---|---|---|
| EP | 1592195 A2 | 11/2005 |
| EP | 1850617 A1 | 10/2007 |
| WO | WO 2009/134625 A2 | 11/2009 |

OTHER PUBLICATIONS

Extended European Search Report dated Jan. 8, 2015 in connection with European Patent Application No. 11190017.1; 6 pages.

* cited by examiner

*Primary Examiner* — Ian N Moore
*Assistant Examiner* — Eric H Wang

(57) ABSTRACT

An apparatus and method connect an Access Point (AP) in a portable terminal. More particularly, an apparatus and method designate a group of searched peripheral APs, and attempt an access to an AP corresponding to a group selected by a user in a portable terminal. The apparatus includes a group set unit and an AP search unit. The group set unit sets items of peripheral APs to a group according to user's selection. After searching the peripheral APs at the time of AP connection, the AP search unit classifies an AP belonging to a selected item and connects to the classified AP.

12 Claims, 4 Drawing Sheets

APPARATUS AND METHOD FOR CONNECTING ACCESS POINT IN PORTABLE TERMINAL

CROSS-REFERENCE TO RELATED APPLICATION(S) AND CLAIM OF PRIORITY

The present application is related to and claims priority under 35 U.S.C. §119(a) to a Korean Patent application filed in the Korean Intellectual Property Office on Nov. 22, 2010 and assigned Serial No. 10-2010-0116329, the contents of which are herein incorporated by reference.

TECHNICAL FIELD OF THE INVENTION

The present invention relates to an apparatus and method for connecting an Access Point (AP) in a portable terminal. More particularly, the present invention relates to an apparatus and method for designating a group of searched peripheral APs, and attempting an access to an AP corresponding to a group selected by a user in a portable terminal.

BACKGROUND OF THE INVENTION

In recent years, portable terminals, a necessity to modern people, have become widely used. A service provider or a system manufacturer is competitively developing a product (or a service) for the differentiation from other enterprises.

For example, the portable terminals evolve into multimedia equipment for a phone book, a game, a Short Message Service (SMS), an Electronic (E)-mail service, a morning call, a MPEG-1 Audio Layer 3 (MP3) player, a schedule management function, a digital camera, and wireless Internet services and provide a variety of services.

To use a packet data service including a multimedia message and the wireless Internet, the portable terminal needs to perform connection with an AP of a corresponding service.

That is, the portable terminal uses a packet data service by transmitting data to the AP but, in a situation where no AP exists, cannot use the packet data service.

To use the packet data service, generally, the portable terminal intends to search peripheral APs and then, connect prioritizing an AP of good signal intensity.

In a case where there mixedly exist an AP licensed to a user and an AP not licensed to the user, and a signal of the AP not licensed to the user is good, the portable terminal periodically performs an operation of needlessly attempting to connect to the AP that is not licensed to the user and thus makes connection impossible.

In addition, the portable terminal stores a plurality of pieces of personal information, but there is a problem that personal information may be leaked through hacking into the AP.

Accordingly, to provide a solution to the above problem, there is a need for an apparatus and method for preventing personal information leakage through an AP and attempting connection with an AP licensed to a user in the portable terminal.

SUMMARY OF THE INVENTION

An aspect of the present disclosure is to substantially solve at least the above problems and/or disadvantages and to provide at least the advantages below. Accordingly, one aspect of the present disclosure is to provide an apparatus and method for grouping and outputting peripheral Access Points (APs) in a portable terminal.

Another aspect of the present disclosure is to provide an apparatus and method for attempting connection to an AP belonging to a group in a portable terminal.

A further aspect of the present disclosure is to provide an apparatus and method for attempting connection to an AP corresponding to a level of an executed application in a portable terminal.

Yet another aspect of the present disclosure is to provide an apparatus and method for solving a problem of information leakage through an AP in a portable terminal.

The above aspects are achieved by providing an apparatus and method for connecting an access point in a portable terminal.

In accordance with an aspect of the present disclosure, an apparatus for connecting an AP in a portable terminal is provided. The apparatus includes a group set unit and an AP search unit. The group set unit sets items of peripheral APs to a group according to user's selection. After searching the peripheral APs at the time of AP connection, the AP search unit classifies an AP belonging to a selected item and connecting to the classified AP.

In accordance with another aspect of the present disclosure, a method for connecting an AP in a portable terminal is provided. The method includes setting items of peripheral APs to a group according to user's selection, after searching the peripheral APs at the time of AP connection, classifying an AP belonging to a selected item, and connecting to the classified AP.

In accordance with a further aspect of the present disclosure, an apparatus for connecting an AP in a portable terminal is provided. The apparatus includes an input unit, a display unit, an AP management unit, and a controller. The input unit selects a group intending to classify APs. The display unit outputs a list of the grouped APs. After setting items of peripheral APs to a group according to user's selection and searching the peripheral APs at the time of AP connection, the AP management unit classifies an AP belonging to a selected item and connecting to the classified AP. The controller controls the input unit, display unit and AP management unit and controls connection with the grouped APs. The AP management unit comprises a Wireless Fidelity (WiFi) module receiving a signal of a peripheral AP.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present invention will become more apparent from the following detailed description when taken in conjunction with the accompanying drawings in which.

Throughout the drawings, like reference numerals will be understood to refer to like parts, components and structures.

DETAILED DESCRIPTION OF THE INVENTION

FIGS. 1 through 4D, discussed below, and the various embodiments used to describe the principles of the present disclosure in this patent document are by way of illustration only and should not be construed in any way to limit the scope of the disclosure.

Embodiments of the present disclosure provide an apparatus and method for grouping and managing peripheral Access Points (APs) using a portable terminal according to the present disclosure, and attempting a connection prioritizing an AP belonging to a group.

Figure 1:
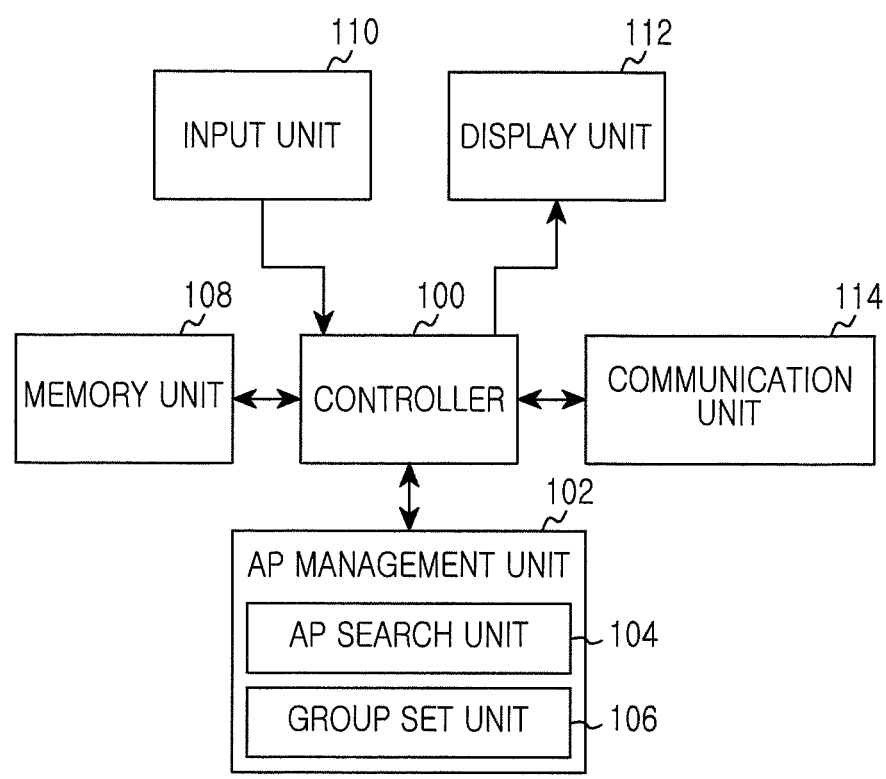
FIG. 1 illustrates a construction of a portable terminal for searching Access Points (APs) grouped according to the present disclosure.

FIG. 1 illustrates a construction of a portable terminal for searching APs grouped according to the present disclosure.

Referring to FIG. 1, the portable terminal can include a controller 100, an AP management unit 102, a memory unit 108, an input unit 110, a display unit 112, and a communication unit 114. The AP management unit 102 can include an AP search unit 104 and a group set unit 106.

The controller 100 of the portable terminal controls a general operation of the portable terminal. For instance, the controller 100 performs processing and control for voice call and data communication. In addition, to use a packet data service including the wireless Internet, the controller 100 can process to search peripheral APs and connect with the searched APs. According to the present disclosure, the controller 100 can group and manage the searched APs.

Accordingly, the controller 100 processes to attempt connection to APs belonging to a group selected by a user among preset groups.

Under the control of the controller 100, the AP management unit 102 searches and groups peripheral APs, and connects with the grouped APs (i.e., the APs belonging to the group selected by the user).

The AP search unit 104 of the AP management unit 102 can include a Wireless Fidelity (WiFi) module. The AP search unit 104 searches APs existing around the portable terminal and outputs a list of items of the searched APs. Further, under the control of the AP management unit 102, the AP search unit 104 connects prioritizing an AP of good signal intensity among APs belonging to a group selected by a user.

The group set unit 106 of the AP management unit 102 is for setting APs intended for connection among a plurality of APs to one group, and can set a plurality of groups according to user's selection.

The memory unit 108 preferably includes, for example, a Read Only Memory (ROM), a Random Access Memory (RAM), a flash ROM, and such. The ROM stores a microcode of a program for processing and controlling the controller 100 and the AP management unit 102 and a variety of reference data.

The RAM, a working memory of the controller 100, stores temporary data generated in execution of a variety of programs. The flash ROM stores a diversity of updateable depository data such as a phone book, an outgoing message, an incoming message and such.

The input unit 110 includes numeral key buttons '0' to '9', a menu button, a cancel button, an OK button, a talk button, an end button, an Internet button, navigation key (or direction key) buttons, and a plurality of function keys such as a character input key. The input unit 110 provides key input data corresponding to a key pressed by a user to the controller 100.

The display unit 112 displays state information generated during operation of the portable terminal, characters, a large amount of moving pictures and still pictures and the like. The display unit 112 outputs a list of APs grouped according to the present disclosure at the time of AP search. The display unit 112 may be a color Liquid Crystal Display (LCD), Active Mode Organic Light Emitting Diode (AMOLED), and such. In an example where the display unit 112 includes a touch input device and is applied to a portable terminal of a touch input scheme, the display unit 112 can be used as an input device of the portable terminal.

The communication unit 114 performs a function of transmitting/receiving and processing a wireless signal of data input/output through an antenna (not illustrated). For example, in a transmission mode, the communication unit 114 performs a function of processing original data through channel coding and spreading, converting the original data into a Radio Frequency (RF) signal, and transmitting the RF signal. In a reception mode, the communication unit 114 performs a function of converting a received RF signal into a baseband signal, processing the baseband signal through de-spreading and channel decoding, and restoring the signal to original data.

A function of the AP management unit 102 can be implemented by the controller 100 of the portable terminal. However, these are separately constructed and shown in the present disclosure as an exemplary construction for description convenience, and should not limit the scope of the present disclosure. It should be understood by those skilled in the art that various modifications of construction can be made within the scope of the present disclosure. For example, construction may be such that all of these are processed in the controller 100.

Figure 2:
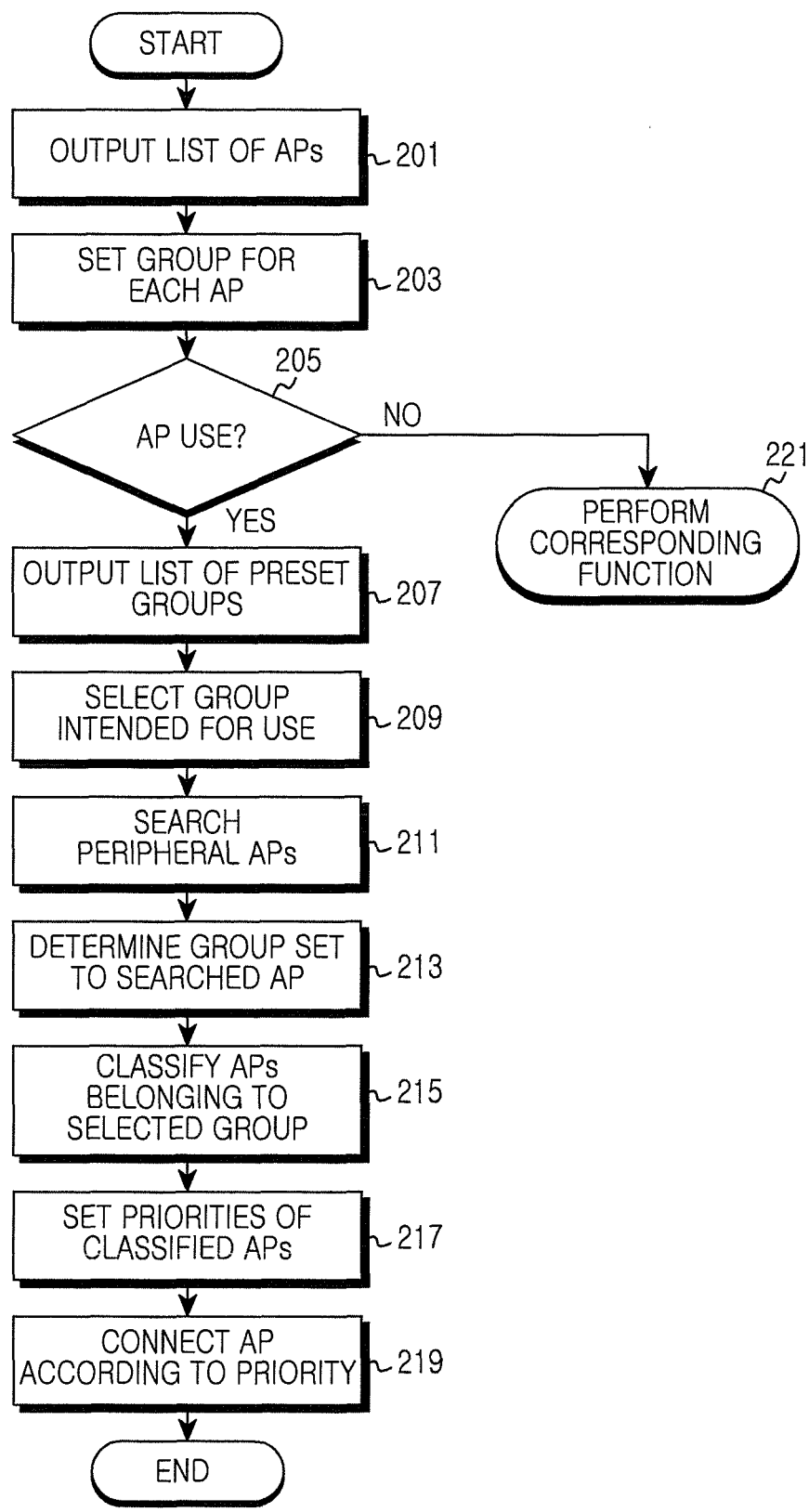
FIG. 2 illustrates an AP connection process of a portable terminal according to the present disclosure.

FIG. 2 illustrates an AP connection process of a portable terminal according to the present disclosure.

Referring to FIG. 2, after the portable terminal outputs a list of peripheral APs in step 201, the portable terminal proceeds to step 203 and sets a group for each AP. For one example, the portable terminal can set a group based on a security level for a peripheral AP in steps 201 to 203. In the example, the security level for the AP can be a level of an AP open to all users, a level of an AP registering an authentication number to grant only an individual's access, and a level of an AP restricting an access of a specific Internet site.

After setting the group for each AP as above, the portable terminal can table and store information of the APs, and the set group.

Next, the portable terminal proceeds to step 205 and determines if an AP use request, i.e., an AP access request (e.g., a WiFi network use request) by a user is generated.

If the portable terminal determines in step 205 that the AP use request by the user is not generated, the portable terminal proceeds to step 221 and performs a corresponding function (e.g., a standby mode).

In contrast, if the portable terminal determines in step 205 that the AP use request by the user is generated, the portable terminal proceeds to step 207 and outputs a list of preset groups. Then the portable terminal proceeds to step 209 and senses user's selection, determining a group of APs that a user intends to use.

Next, the portable terminal proceeds to step 211 and searches peripheral APs and then, proceeds to step 213 and determines a group corresponding to the searched APs.

To determine the group corresponding to the APs, the portable terminal can compare information of the searched AP with previously stored tabled group information.

After that, the portable terminal proceeds to step 215 and classifies APs belonging to the group selected by the user in step 209 among the APs searched in step 211. Next, the portable terminal proceeds to step 217 and sets priorities of the classified APs. Here, the priority of the classified AP can be an intensity of a signal of the AP.

Next, the portable terminal proceeds to step 219 and performs AP connection according to priority.

As a result, the portable terminal connects with an AP corresponding to a group according to a user's characteristic, thereby being capable of preventing an attempt to access an AP other than an AP that a user intends to access.

Thereafter, the portable terminal terminates the algorithm according to the present disclosure.

Figure 3:
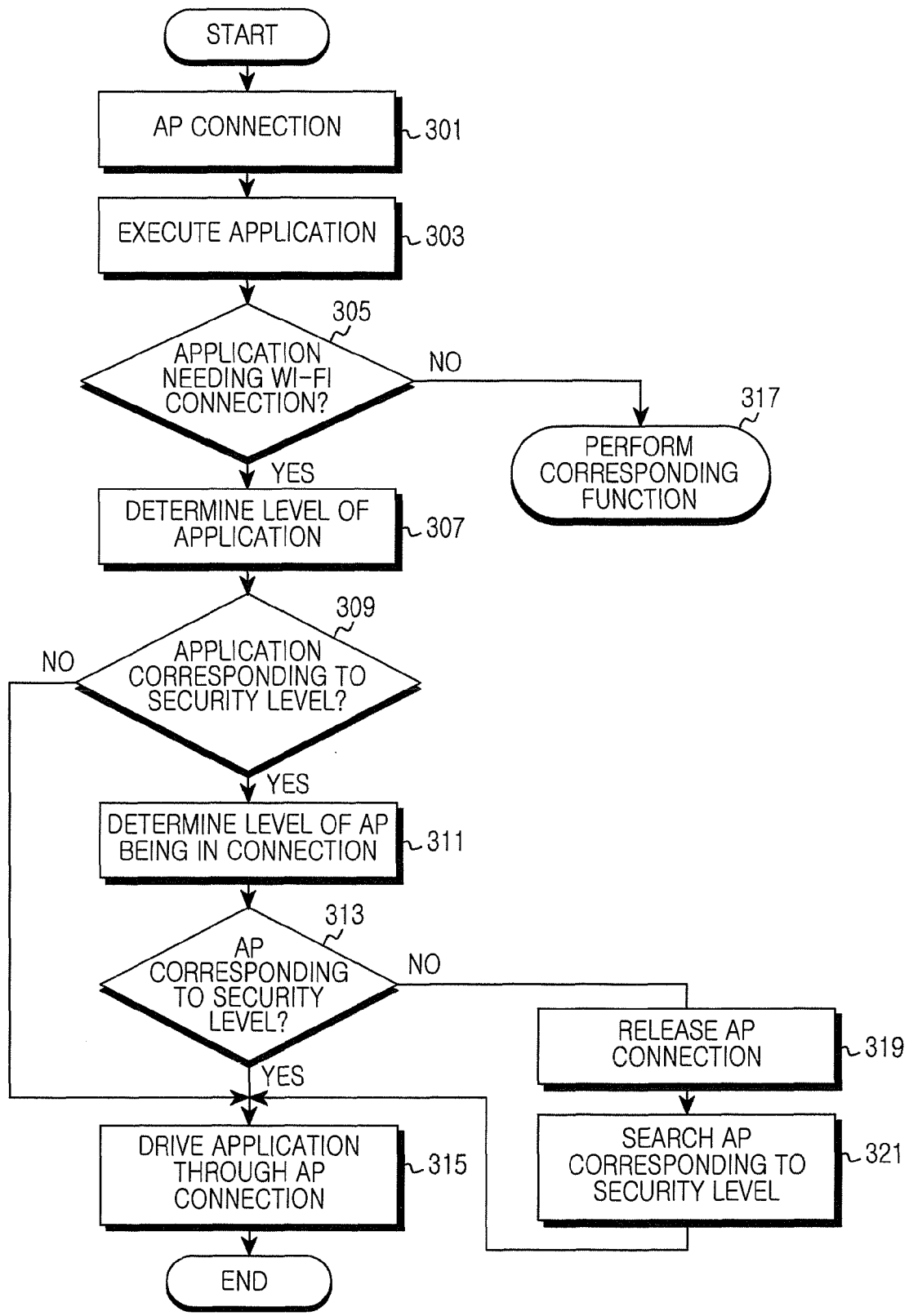
FIG. 3 illustrates an AP connection process of a portable terminal according to an exemplary embodiment of the present disclosure.

FIG. 3 illustrates an AP connection process of a portable terminal according to an exemplary embodiment of the present disclosure.

Referring to FIG. 3, the portable terminal connects with an AP in step 301 and then, in step 303, the portable terminal executes an application according to a user's request.

Next, the portable terminal proceeds to step 305 and determines if an application that a user intends to execute is an application needing WiFi connection. Here, the application needing the WiFi connection represents an application needing wireless Internet connection such as an electronic mail (e-mail) application and a social media messaging (e.g., Twitter) application.

If the portable terminal determines in step 305 that the portable terminal intends to execute an application not needing WiFi connection, the portable terminal proceeds to step 317 and performs a corresponding function (e.g., execution of a requested application).

In contrast, if the portable terminal determines in step 305 that the portable terminal intends to execute the application needing the WiFi connection, the portable terminal proceeds to step 307 and determines a level of the application that the user intends to execute. Here, the level of the application, a level representing user's personal information protection, can be divided into an application of a security level a financial application, an e-mail application for business use, an e-mail application for individual use and the like) and an application of a general level (e.g., a game application, a messenger application and the like).

After that, the portable terminal proceeds to step 309 and determines the level of the application determined in step 307.

If the portable terminal determines in step 309 that the determined level of the application is a security level requiring security, the portable terminal proceeds to step 311 and determines a level of an AP being in previous connection. Then the portable terminal proceeds to step 313 and determines if the level of the AP being in previous connection determined in step 311 is a security level. Here, as illustrated in FIG. 2, the security level of the AP can be a level of an AP open to all users, a level of an AP registering an authentication number to grant only an individual's access, and a level of an AP restricting an access of a specific Internet site. The AP of the security level can be of a level of an AP restricting an access of a specific Internet site.

If the portable terminal determines in step 313 that the portable terminal is in connection with the AP of the security level, the portable terminal proceeds to step 315 and processes to drive an application through connection of the AP of the security level, protecting user's personal information.

In contrast, if the portable terminal determines in step 313 that the portable terminal is in connection with an AP of a general level (i.e., a non-security level), the portable terminal proceeds to step 319 and releases the connection with the AP of the non-security level. Then the portable terminal proceeds to step 321 and searches an AP of a security level. Here, the portable terminal can search the AP of the security level using group information that is set in FIG. 2.

After that, the portable terminal proceeds to step 315 and processes to drive an application through connection of the AP of the security level, protecting user's personal information.

The portable terminal of FIG. 3 automatically searches and connects an AP of a level of an application executed by a user, thus protecting user's personal information.

Next, the portable terminal terminates the algorithm according to the present disclosure.

FIGS. 4A-4D illustrate AP search screens of a portable terminal according to a desirable exemplary embodiment of the present disclosure.

Figures 4A, 4B, 4C, 4D:
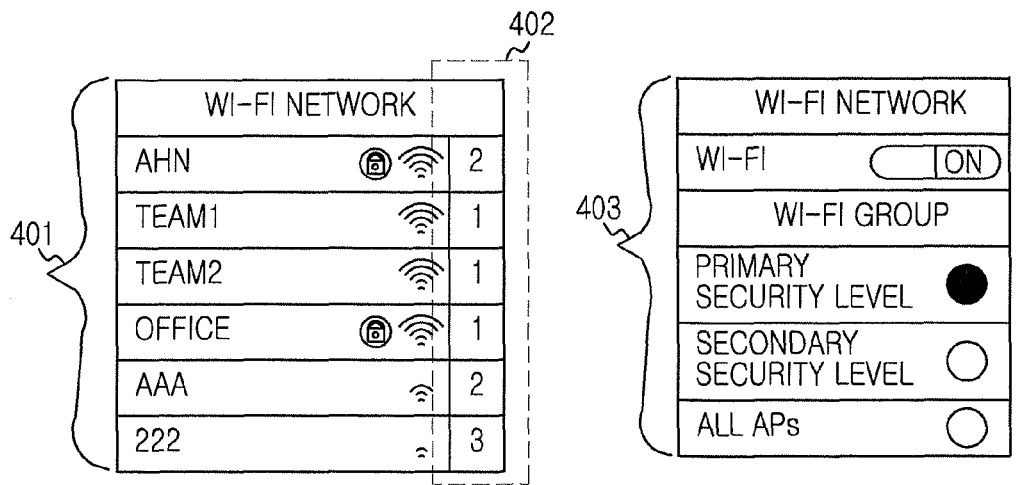
FIGS. 4A-4D illustrate AP search screens of a portable terminal according to a desirable exemplary embodiment of the present disclosure.

Referring to FIG. 4A, when searching peripheral APs, the portable terminal generally outputs (401) a list of the peripheral APs as illustrated in FIG. 4A. At this time, the portable terminal displays the names (e.g., 'TEAM1', 'TEAM2', 'OFFICE', 'AHN', 'AAA', 'ZZZ') of the searched APs, an intensity of a receive signal, and an access set state (i.e., a password set state) and the like.

In addition to this, the portable terminal can set groups for the respective output APs according to the present disclosure.

A user of the portable terminal can set a group for each AP. If the group is set as above, the portable terminal displays (402) set levels at the sides of the items of the searched APs.

For one example, the user of the portable terminal can divide groups of APs according to security level. That is, as illustrated, the user can set APs (e.g., 'TEAM1', 'TEAM2', 'OFFICE') restricting an access of a specific Internet site, to primary security levels, and set APs (e.g., 'AHN', 'AAA', 'ZZZ') possessed by individual persons, to secondary security levels.

The APs set to the primary security levels can be APs with self-security systems for performing anti-spam and blocking an access to a site of low safety. Accordingly, the portable terminal should use the AP that the user sets to the primary security level and, although a signal of the AP included in the secondary security level is good, the portable terminal connects with the AP set to the primary security level.

After setting the groups for the APs according to the present disclosure as above, if the user of the portable terminal enters a Wireless Local Area Network (WLAN) set menu in order to perform a WiFi function, the portable terminal outputs a button activating a WiFi function and items of the preset groups of the APs. As illustrated in FIG. 4B, the portable terminal outputs (403) items of preset primary security level, secondary security level, and general AP level such that the portable terminal searches an AP of a corresponding level according to user's selection. That is, if the user selects the primary security level, the portable terminal will intend to search and connect APs set to the primary security levels as illustrated in FIG. 4C.

If the portable terminal searches and connects the APs set to the primary security levels as above, the portable terminal can prevent AP hacking through an AP whose security against the external Internet is verified and, although using the Internet, the portable terminal can prevent a leakage of main information (i.e., development secret, business secret, confidential document, personal authentication information and the like).

Further, if the user selects the secondary security level, the portable terminal will intend to search and connect the APs set to the secondary security levels as illustrated in FIG. 4D.

In addition, if the user intends to search all APs, the portable terminal will intend to search and connect all peripheral APs like an existing portable terminal.

As described above, exemplary embodiments of the present disclosure are for grouping and managing APs existing around a portable terminal. In order to attempt connection prioritizing an AP belonging to a group, the exemplary embodiments of the present disclosure can omit a process of unnecessarily attempting connection to an AP not licensed to itself, and can set a group of high security, thus preventing information leakage using an AP.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus comprising:
a controller configured to:
classify Access Points (APs) to at least two AP groups according to a user selection;
determine a security level of an application when the application is executed;
determine an AP group of the at least two AP groups corresponding to the determined security level of the application;
after searching the APs, select one of the APs associated with the determined AP group among the searched APs;
connect to the selected AP;
determine whether another executed application uses a WiFi connection;
control a display unit to display a list of preset security levels;
receive a selection of any one preset security level among the list of preset security levels;
determine whether the selected AP corresponds to the selected security level; and
responsive to the other executed application corresponding to the selected security level and the selected AP not corresponding to the selected security level, terminate the connection to the selected AP and connect to another of the APs corresponding to the selected security level.

2. The apparatus of claim 1, wherein, after classifying APs to at least two AP groups according to the user selection, the controller is further configured to:
responsive to the determination of the AP group, search the APs before selecting the AP associated with the determined AP group among the searched APs and connecting to the selected AP.

3. The apparatus of claim 1, wherein the controller is further configured to set APs of high security among the searched APs as one of the at least two AP groups.

4. The apparatus of claim 3, wherein the controller is further configured to connect to the APs belonging to the one AP group according to a priority.

5. A method, comprising:
classifying Access Points (APs) to at least two AP groups according to a user selection;
determining a security level of an application when the application is executed;
determining an AP group of the at least two AP groups corresponding to the determined security level of the application;
after searching the APs, selecting an AP associated with the determined AP group among the searched APs;
connecting to the selected AP
determining whether another executed application uses a WiFi connection;
displaying a list of preset security levels;
receiving a selection of any one preset security level among the list of preset security levels;
determining whether the selected AP corresponds to the selected security level; and
responsive to the other executed application corresponding to the selected security level and the selected AP not corresponding to the selected security level, terminating the connection to the selected AP and connecting to another of the APs corresponding to the selected security level.

6. The method of claim 5 further comprising:
after classifying APs to the at least two AP groups according to the user selection, responsive to detecting determination of the AP group, searching the APs before selecting the AP associated with the determined AP group among the searched APs and connecting to the selected AP.

7. The method of claim 5, further comprising setting APs of high security among the searched APs as of the at least two AP groups.

8. The method of claim 7, further comprising connecting to the APs belonging to the one AP group according to a priority.

9. An apparatus, comprising:
an input unit configured to enable user selection of a group into which to assign Access Points (APs) for purposes of classifying the APs into at least two AP groups;
a display unit configured to output a list of the at least two AP groups;
an AP management unit configured to, after setting the APs to a group according to a user selection, determine an AP group of the at least two AP groups corresponding to a security level of an application, search the APs associated with the determined AP group, and select an AP associated with the determined AP group; and
a controller configured to;
control the input unit, the display unit, and the AP management unit; and
control connection with the APs, wherein the AP management unit comprises a Wireless Fidelity (WiFi) module configured to receive a signal of one of the APs,
determine whether another executed application uses a WiFi connection;
control the display unit to display a list of preset security levels,
receive a selection of any one preset security level among the list of preset security levels,
determine whether the selected AP corresponds to the selected security level, and
responsive to the other executed application corresponding to the selected security level and the selected AP not corresponding to the selected security level, terminate the connection with the selected AP and connect with another AP corresponding to the selected security level.

10. The apparatus of claim 9, wherein the AP management unit is further configured to search the APs of the AP group corresponding, among the preset security levels, to a security level of the application in response to execution of the application being detected.

11. The apparatus of claim 1, wherein the AP management unit is further configured to set APs of high security as one of the at least two AP groups.

12. The apparatus of claim 9, wherein the controller is further configured to connect to the APs belonging to the one AP group according to priority.

\* \* \* \* \*